(No Model.)

A. T. MOORE.
CHECKREIN HOOK.

No. 550,049. Patented Nov. 19, 1895.

WITNESSES:
M. D. Bloudd.
Chas. E. Brock.

INVENTOR
A. T. Moore.
BY R. S. & A. P. Lacey
ATTORNEYS

United States Patent Office.

AARON THOMAS MOORE, OF CADIZ, OHIO.

CHECKREIN-HOOK.

SPECIFICATION forming part of Letters Patent No. 550,049, dated November 19, 1895.

Application filed February 26, 1895. Serial No. 539,765. (No model.)

*To all whom it may concern:*

Be it known that I, AARON THOMAS MOORE, a citizen of the United States, residing at Cadiz, in the county of Harrison, State of Ohio, have invented certain new and useful Improvements in Checkrein-Hooks; and I do hereby declare the following to be a full, clear, and exact description of the invention, such as will enable others skilled in the art to which it appertains to make and use the same.

This invention is an improved check-hook for harness-saddles, the object of this invention being to provide an exceedingly neat and simple form of check-hook, one that is absolutely safe under all conditions, and one in which the checkrein-strap serves to bind the parts tightly together.

My invention consists in the novel manner of constructing and combining the parts, as will be fully explained hereinafter, and pointed out in the claims.

Figure 1:
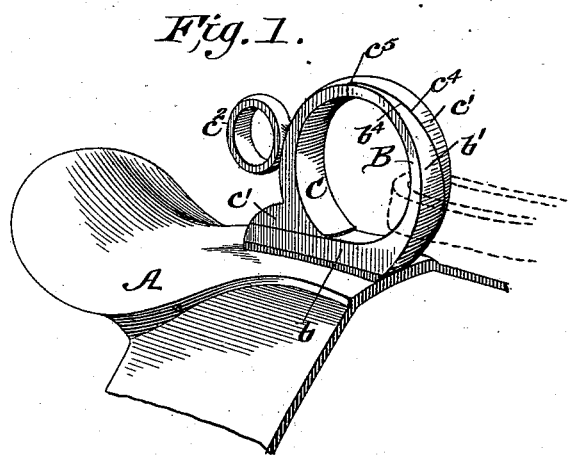
Figure 2:
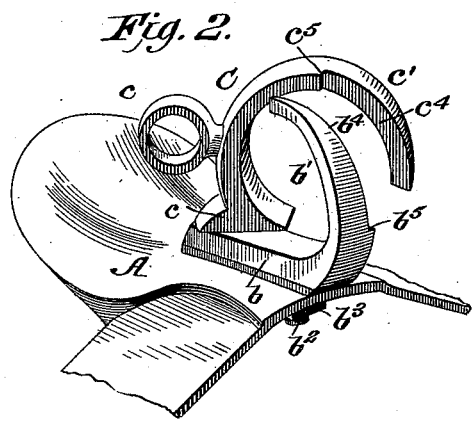
Figure 3:
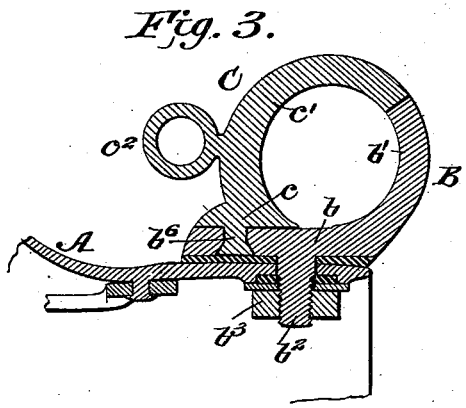
Figure 4:
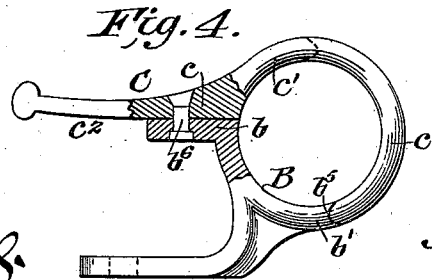

In the drawings forming a part of this specification, Figure 1 is a perspective view of my improved check-hook, showing the rein in position. Fig. 2 is a view showing the hook opened. Fig. 3 is a sectional view, and Fig. 4 is a detail view of a slightly-modified form of construction.

In carrying out my invention I employ a harness-saddle jockey A, constructed as usual or in any approved manner. Connected to this jockey is a hook B, having a flat base portion $b$ and the upwardly-curved hook portion $b'$. Depending from the base-piece $b$ is a threaded shank $b^2$, which passes down through the jockey and carries a nut $b^3$ upon the under side of jockey, whereby said hook is connected securely to the harness-saddle. The hook portion $b'$ is reduced and tapered, as shown at $b^4$, and provides a horizontal shoulder $b^5$. Pivotally connected with the base portion $b$ by means of a bolt or rivet $b^6$ is a keeper C, which has a broad flat base $c$, a downwardly-curved portion $c'$, and a rear extension or handle $c^2$, said curved portion being reduced and tapered reversely of the hook $b'$, as shown at $c^4$, and providing a vertical shoulder $c^5$, the hook and keeper being so constructed that when the keeper is swung horizontally upon its pivot the tapered faces of the hook and keeper contact and the end of the keeper engages or fits upon the shoulder $b^5$, while the end of the hook will engage or fit upon the shoulder $c^5$.

By means of the reduced and tapered portions the hook and keeper can be brought together and form a ring-like body of uniform thickness throughout, and while I have shown the hook and keeper as curved to form a circle or ring it is obvious they could be made angular to form a square or rectangle and still be within the scope of my invention.

Now, in operation, the check-hook, constructed according to either form, is attached to the saddle-jockey, and the checkrein may be a single strap, or a strap with a loop, or a double strap, as desired. When the checkrein is to be hooked, the keeper is thrown horizontally from the hook by pressing laterally upon the handle $c^2$, and the rein can then be passed over the end of the hook or keeper, as preferred, and forced beyond the shoulder on the hook or keeper. The keeper is then moved back to contact with the hook and the rein moved up, so that it encircles both. The keeper is thus securely held in a locked position, and it is impossible to dislodge the same. The handle $c^2$ also serves as a point to place the fingers against when the thumb is placed beneath the rein to draw it back, as in unchecking.

It will be noticed also that by the use of this construction of check-hook all springs and similar contrivances are avoided.

Having thus described my invention, what I claim, and desire to obtain by Letters Patent, is—

1. In a check rein hook, the combination, with the saddle jockey, of the base, hook, and shank all formed in one piece, and the keeper hook, pivot, and handle, all formed in one piece, said keeper being pivoted to the base at a point rear of said base's attachment to the jockey, substantially as shown and described.

2. In a checkrein hook, the combination of the base and hook portions, formed integral, said hook being tapered, and reduced to provide a shoulder, the base having a rear extension in a plane above the base proper; the handle and keeper portions formed integral, and the pivot connecting said portions, the handle portion projecting beyond rearwardly the pivotal point, and also beyond the rear end of base, substantially as shown and described.

3. In a checkrein hook, the combination, with the jockey A, of the hook B, having a base $b$, and hook $b'$, said hook being tapered and provided with the horizontal shoulder $b^5$, the keeper hook C having the broad flat base $c$, the keeper $c'$ having the vertical shoulder, $c^5$, and the rear extension or handle $c^2$, and the pivotal bolt or rivet $b^6$, connecting the parts B and C, the handle or base extension $c^2$, extending rearward, beyond the pivotal point, substantially as shown and described.

In testimony whereof I affix my signature in presence of two witnesses.

AARON THOMAS MOORE.

Witnesses:
JOHN M. GARVIN,
ALBERT O. BARNES.